United States Patent [19]
Karger

[11] Patent Number: 4,462,976
[45] Date of Patent: Jul. 31, 1984

[54] METHOD FOR THE TREATMENT OF CHLORIDE-CONTAINING WASTE WATERS

[75] Inventor: Robert Karger, Dortmund, Fed. Rep. of Germany

[73] Assignee: Vereinigte Elektrizitätswerke Westfalen AG, Dortmund, Fed. Rep. of Germany

[21] Appl. No.: 352,857

[22] Filed: Feb. 26, 1982

[30] Foreign Application Priority Data

Mar. 6, 1981 [DE] Fed. Rep. of Germany ....... 3108444

[51] Int. Cl.³ .......................... C01B 7/03; C01F 11/46
[52] U.S. Cl. ..................................... 423/481; 423/178; 423/482; 423/488; 423/555; 210/702; 210/712
[58] Field of Search ............... 423/178, 481, 166, 488, 423/555, 482; 210/702, 712

[56] References Cited

U.S. PATENT DOCUMENTS

| | | | |
|---|---|---|---|
| 601,006 | 3/1898 | Sturcke | 423/163 |
| 1,581,436 | 4/1926 | Galt | 423/482 |
| 3,233,978 | 2/1966 | Alkemade | 423/488 |
| 4,120,737 | 10/1978 | Berrie et al. | 423/166 |

FOREIGN PATENT DOCUMENTS

1136579 12/1968 United Kingdom .
1546586 5/1979 United Kingdom .

OTHER PUBLICATIONS

Henglein et al, German printed application M 24936 IVa/12i, Jun. 29, 1956.

*Primary Examiner*—Earl C. Thomas
*Attorney, Agent, or Firm*—Toren, McGeady and Stanger

[57] ABSTRACT

Treatment of waste water containing chlorides comprising treatment with $Ca(OH)_2$ or $CaCO_3$ to convert the chlorides to $CaCl_2$, adding sulfuric acid to said water in a reaction vessel to produce hydrochloric acid and gypsum, circulating the mixture in a closed cycle between the reaction vessel and a distillation column for the extractive distillation of the resulting hydrochloric acid, and filtering out the accumulating gypsum sludge from the treated waste water, wherein the added amount of waste water amount of hydrochloric acid correspond to the amount of sludge exiting the reaction vessel or the amount of distillate removed from the distilling column and the amount of gypsum separated, and the hydrochloric acid concentration in the liquid is less than the maximum azeotropic concentration for a mixture of $H_2O$ and $HCl$.

13 Claims, 1 Drawing Figure

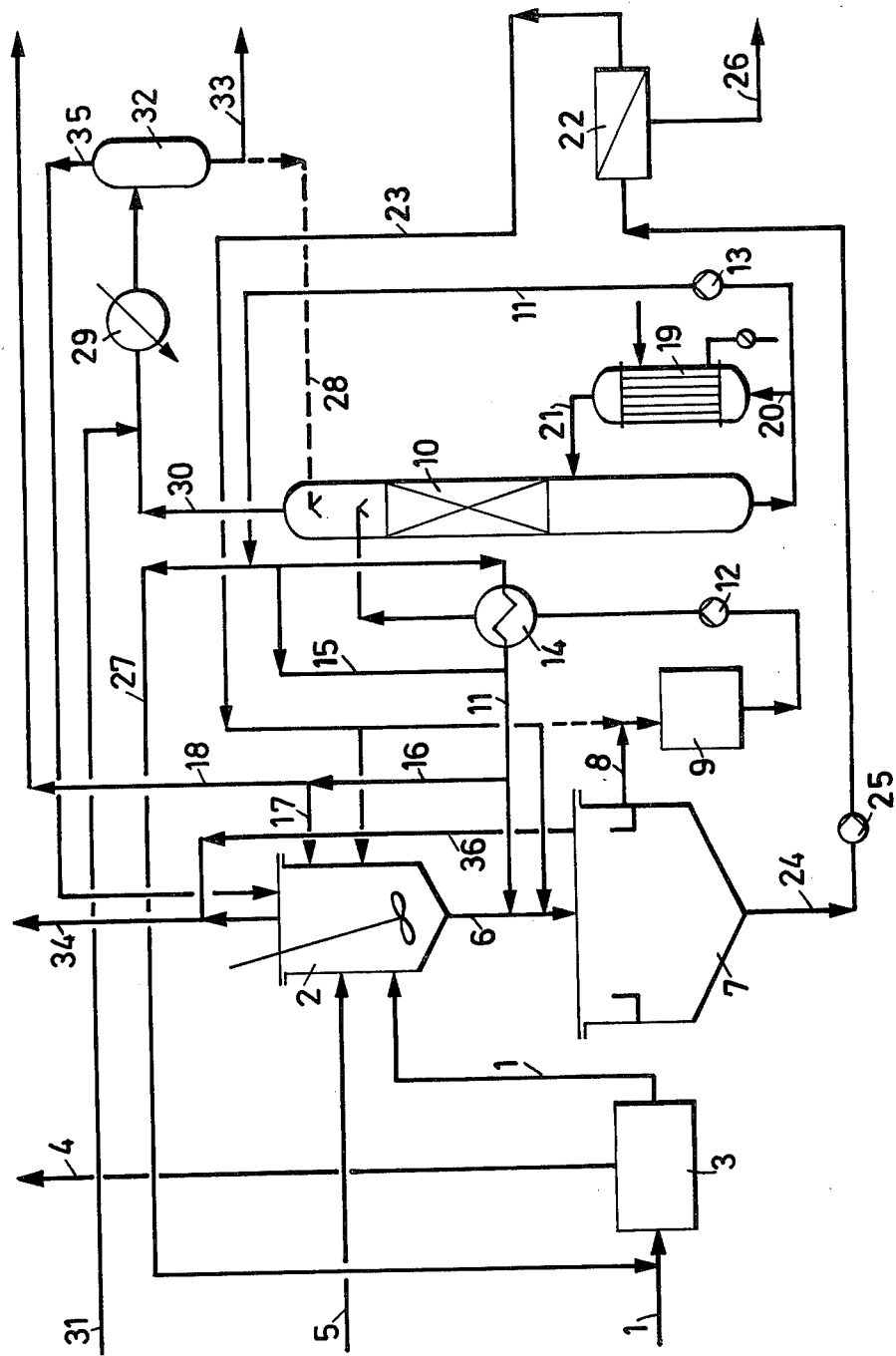

METHOD FOR THE TREATMENT OF CHLORIDE-CONTAINING WASTE WATERS

BACKGROUND OF THE INVENTION

1. Field of the Invention

The invention relates to a method and a plant for the treatment of waste water, particularly that which contains calcium chloride and which accumulates, for instance, in washers for gas purification or in plants for desalting of mixtures of solids.

2. Description of the Prior Art

Gas purification washers are used, for example, for desulfurization of flue gases from steam generators which are heated with fossil fuels. In these washers, waste water containing calcium chloride and other chlorides accumulates. The chloride concentration depends on the chloride content of the fuels and on the method of operation of the gas purification plant.

Waste water which contains chloride can also accumulate during the extraction of chloride-containing mixtures of solids which originate from plants for dry gas purification with alkali compounds or alkaline earth compounds.

The large amounts of chloride-containing waste water which accumulate lead to a considerable stress of the main canal, particularly in large plants. Even when the waste waters are vaporized or spray dried, the calcium chloride salt obtained has only limited industrial use, resulting in large amounts being stored in deposit areas. For this purpose, the calcium chloride salts must be packed in a permanently waterproof way due to their hygroscopic behavior and their water solubility and this incurs considerable expenses.

SUMMARY OF THE INVENTION

I have discovered a method and a plant for the treatment of waste waters which contain calcium chloride and other chlorides which results in a considerably lesser stress on the main canal, prevents the packaging and storage of calcium chloride salts in deposit areas and permits the recovery of industrially usable products from the waste water.

More particularly, in the method of the present invention, sulfuric acid is mixed in with the waste waters and the thus resulting hydrochloric acid and the precipitated gypsum are separated from the waste water. Hydrochloric acid and gypsum are both industrially useful. For instance, hydrochloric acid can be used directly in a power plant for the treatment of boiler feed water and gypsum is used in the construction industry.

The plant of the present invention is composed of a reaction vessel having a waste water feed pipe, a sulfuric acid feed pipe, and a sludge outlet line, said sludge outlet line being connected to a solids separator for separating the solids from the liquid in the sludge. The thus separated liquid is then heated in means for separating and recovering the hydrochloric acid liquid or gas.

BRIEF DESCRIPTION OF THE DRAWING

The drawing is a schematic flow diagram of a plant in accordance with the present invention.

DESCRIPTION OF THE PREFERRED EMBODIMENT

Calcium chloride is not immediately completely converted with sulfuric acid. Rather, a state of equilibrium sets in. Accordingly, the waste water to which the sulfuric acid was added is advantageously circulated in a closed cycle between a reaction vessel and a distilling column, wherein the amount of waste water and sulfuric acid which is fed into the plant corresponds to the amount of sludge which flows out of the reaction vessel or the distillate which is removed from the distilling column and the gypsum which is separated with the filter. It is not particularly important as to what extent the calcium chloride and sulfuric acid react with one another, because these substances continue to undergo reaction since they are returned from the distilling column. Sulfuric acid can be dosed in such a way that optimum conditions result for the distilling column which is located in the liquid cycle.

A mixture of $H_2O$, $HCl$, $H_2SO_4$ with a small amount of $CaCl_2$ or a mixture of $H_2O$, $HCl$, $CaCl_2$ with a small amount of $H_2SO_4$ are limiting insofar as the azeotropic composition of HCl is concerned. Thus, the amount of HCl in the distillation mixture and, consequently, in the vapor is less than the maximum azeotropic concentration for the mixture $H_2O/HCl$. With the present invention, it is possible to vary the mixture so as to obtain a higher HCl concentration and recovery in the vapor than that of the azeotropic $HCl/H_2O$ mixture.

If the $CaCl_2$ concentration is not adequate, the $CaCl_2$ concentration in the waste water can be increased before entry into the cycle, whereby a portion of the waste water can be removed into the main canal as clean evaporator condensate. In waste waters containing chloride which is not in the form of $CaCl_2$, for example, as $NH_4Cl$, reaction with lime milk or calcium carbonate is necessary before the waste water is fed into the cycle.

For waste waters which contain in addition to calcium, larger amounts of sodium, potassium and magnesium, it is advantageous to control the process such that a low chloride concentration and a high sulfuric acid concentration of up to 75 weight percent is set in the cycle. In this case, a portion of the liquid in the cycle is removed after passing through the distilling column and is neutralized with lime milk or calcium carbonate. The gypsum produced is separated, while the remaining waste water can be discharged into the main canal almost free of chloride. A substantially chloride-free waste water results when a great excess of sulfuric acid and only minor portions of calcium chloride are in the cycle and the hydrochloric acid formed is distilled off.

However, if the waste water contains only small amounts of sodium, potassium and magnesium in relation to the calcium chloride, the method is advantageously controlled, such that a saturation level of the concentration of calcium chloride and a low sulfur concentration are set and maintained in the cycle. In this case, the removal of liquid from the cycle may be omitted because the sodium, potassium, and magnesium impurities are removed with the gypsum.

The concentration of sulfuric acid and calcium chloride in the cycle can be controlled to optimize the process by changing the amount of liquid removed from the cycle, by changing the residual amount removed from the distilling column and conducted to the reactor vessel and/or to the solids separator, and/or by changing the ratio of sulfuric acid to calcium chloride. The gypsum which results during this procedure, is filtered from the sludge which leaves the solids separator. The filtrate is then again conducted to the reaction vessel, the separator of solids, and/or the working tank.

In order to attain a specific concentration of hydrochloric acid in the distillate, completely desalted water may be added to the distillate. In addition, the concentration of the hydrochloric acid can be adjusted by returning a part of the distillate which is condensed from the distilling column to the intensifier section of the distilling column. Depending on the return ratio, a dry HCl gas can be produced in this manner.

A plant for carrying out the method of the present invention is composed of a reaction vessel having a waste water feed pipe, a sulfuric acid feed pipe, and a discharge for the sludge as well as a solids separator and a device for the recovery of hydrochloric acid or HCl gas from the separated liquid. Advantageously, the recovery device is a distilling column having a feed pipe for the separated liquid removed from the solids separator and a return line to the reaction vessel and/or solids separator for the residue removed from the distilling column. In this way, the liquid is continuously circulated in the cycle and the yield is improved.

Since the course of the reaction also depends on the temperature level in the cycle and the plant should consume as little externally supplied energy as possible, a heat exchanger may be arranged between the separated liquid line leading to the distilling column and the residue return line. A by-pass line may extend parallel to the heat exchanger in order to simplify temperature control of the returned residue.

Advantageously, the distilling column is heated with steam from a reboiler which is acted upon with a part of the residue removed from the distilling column. In order to achieve flexibility in the control of the amounts of liquid which are circulated in the cycle, it is also advantageous to arrange a working tank in the separate liquid line.

The concentration of the calcium chloride contained in the waste water conducted to the reaction vessel can be controlled with a concentrator arranged in the waste water feed pipe. The evaporator condensate discharged from the concentrator is free from chloride and can be introduced into the main canal. However, this is not true at the discharge line arranged at the residue return line. Here, it is necessary to neutralize the excessive sulfuric acid in the stream using lime milk or calcium carbonate. The resulting liquid is almost free of chloride and can also be discharged into the main canal.

The solids separator is preferably a heavy medium separator with a filter connected after it in the flow sequence. In this case, a filtrate return line extends from the filter to the reaction vessel, to the heavy medium separator, and/or to the working tank.

Another connecting line extends between the residue return line and the waste water feed pipe before the concentrator. A return line also extends from the liquid separator which is connected after the condenser to the distilling column.

Referring to the drawing, waste water which accumulates, for example, in a flue gas desulfurization plant of a power station which is heated with fossil fuels, is fed via a waste water feed pipe 1 into a reaction vessel 2. If necessary, the concentration of calcium chloride in the waste water is increased in a concentrator 3 which is connected before the reaction vessel 2. The evaporator condensate 4 which accumulates during concentration of the waste water in the concentrator 3, can be discharged directly into the main canal.

The reaction vessel 2 has a sulfuric acid feed pipe 5 with a sludge outlet line 6. The sludge outlet line 6 leads to a solids separator in form of a heavy medium separator 7 which has on the one side, a separated liquid line 8 and on the other side, a sludge outlet line 24. The clear phase line 8 leads via a working tank 9 to a distilling column 10. The separated liquid is transported by a circulation pump 12 via a heat exchanger 14 to the distilling column 10. The remaining residue is pumped by means of an additional circulation pump 13 via a residue return line 11 from the distilling column 10 and is conducted to a heat exchanger 14. This heat exchanger 14 is also connected to the separated liquid line 8 so that a temperature compensation takes place between the separated liquid and the returned residue.

The residue return line 11 is connected on the one side with the sludge outlet line 6 as well as a branch line 16 and an additional branch line 17 connected to the reaction vessel 2. The heat exchanger can be shunted by means of a by-pass line 15. A discharge line 18 leads from the branch line 17 to a neutralization device which is not shown and in which the discharged material is neutralized by means of lime milk or calcium carbonate and thus precipitated. After separation of the precipitated substances, the discharge liquid can be conducted through discharge line 18 into the main canal.

An additional connecting line 27 which is connected with the residue return line 11 leads to waste water feed pipe 1 before its entry into concentrator 3 to provide for entry of the residue into the concentrator.

The distilling column 10 is heated by means of steam from a steam line 21 which is connected to reboiler 19. A partial stream of the residue which is removed from the distilling column 10 is fed into the reboiler 19 by means of a residue branch line 20 and is partially vaporized in the reboiler 19. The remaining amount of residue is fed by means of the circulating pump 13 to the waste water feed line 1, the sludge outlet line 6, the reaction vessel 2, and/or the discharge line 18. In addition, the sludge which is removed from the heavy medium separator 7 by means of a circulating pump 25 through a sludge outlet line 24 is separated from the gypsum in filter 22 and the gypsum is removed by means of gypsum discharge line 26 from filter 22. The filtrate accumulating in filter 22 is conducted by means of filtrate return line 23 to the sludge outlet line 6, reaction vessel 2, and/or working tank 9. In this way, the concentration of any desired substance can be set depending on the amounts conducted through the various lines and in this way, the process can be controlled.

A condenser 29 is connected with the distilling column 10 by means of distilling line 30. The distillate is separated from the entrained gases in a liquid separator 32 and the hydrochloric acid produced is removed by means of line 33. Depending on the desired concentration of the distillate, a predetermined amount of distillate can be conducted to the distilling column 10 by means of return line 28 so that, in connection with line 31 for desalted water, all the concentrations of hydrochloric acid desired up to dry HCl gas can be obtained. The gases which are separated in the reaction vessel 2, in the heavy medium separator 7 and in the solids separator 32 are removed by means of lines 34, 35 and 36, and are further treated, if necessary.

Usually, the $H_2O$ which is introduced into the plant with the waste water can be removed with the hydrochloric acid produced. Excess $H_2O$ from the concentrator can be removed into the main canal without any stress on the environment.

With the plant according to the invention, waste waters containing calcium chloride of varying compositions and concentrations can be treated economically at nearly stoichiometrical consumption of sulfuric acid in such a way that industrially useful products in the form of hydrochloric acid and gypsum can be obtained.

I claim:

1. A method for the treatment of waste water containing calcium chloride, comprising adding sulfuric acid to the waste water in a reaction vessel to produce hydrochloric acid and gypsum and circulating the mixture in a closed cycle between a reaction vessel and a distilling column having an intensifier section for the extractive distillation of the resulting hydrochloric acid, and filtering out the accumulating gypsum sludge from the treated waste water, wherein the added amount of waste water and amount of hydrochloric acid correspond to the amount of sludge exiting the reaction vessel or the amount of distillate removed from the distilling column and the amount of gypsum separated, and the hydrochloric acid concentration in the liquid is less that the maximum azeotropic concentration for a mixture of $H_2O$ and $HCl$.

2. The method of claim 1 wherein the waste water is concentrated before it enters the closed cycle.

3. A method for the treatment of waste water containing chlorides, comprising treating the waste water with $Ca(OH)_2$ or $CaCO_3$ to convert the chloride compounds to $CaCl_2$, adding sulfuric acid to the wast water in a reaction vessel to produce hydrochloric acid and gypsum and circulating the mixture in a closed cycle between a reaction vessel and a distilling column having an intensifier section for the extractive distillation of the resulting hydrochloric acid, and filtering out the accumulating gypsum sludge from the treated waste water, wherein the added amount of waste water and amount of hydrochloric acid correspond to the amount of sludge exiting the reaction vessel or the amount of distillate removed from the distilling column and the amount of gypsum separated, and the hydrochloric acid concentration in the liquid is less than the maximum azeotropic concentration for a mixture of $H_3O$ and $HCl$.

4. The method of claim 1, 2 or 3 wherein the waste water introduced to the cycle also contains relatively large amounts of sodium, potassium and magnesium and relatively less amounts of chloride and up to about 75 percent by weight sulfuric acid.

5. The method of claim 1, 2, or 3, wherein the waste water introduced to the cycle contains relatively small amounts of sodium, potassium, and magnesium, up to a saturation concentration of calcium chloride, and a relatively low concentration of sulfuric acid.

6. The method of claim 1, 2, or 3, wherein the concentrations of sulfuric acid and calcium chloride are set in the cycle by controlling the amount of liquid removed from the cycle.

7. The method of claim 1, 2, or 3, wherein the concentrations of sulfuric acid and calcium chloride in the cycle are set by controlling the amount of residue removed from the distilling column and returned to the reaction vessel or solids separator.

8. The method of claim 1, 2, or 3, wherein the concentrations of sulfuric acid and calcium chloride in the cycle are set by changing the ratios of sulfuric acid to calcium chloride.

9. The method of claim 8, wherein gypsum is filtered from the sludge and the filtrate is returned to the reaction vessel.

10. The method of claim 8, wherein gypsum is filtered from the sludge and the filtrate is returned to the solids separator.

11. The method of claim 8, wherein gypsum is filtered from the sludge and the filtrate is returned to the reaction vessel and the solids separator.

12. The method of claim 1, 2, or 3, wherein completely desalted water is fed to the distillate to set the hydrochloric acid concentration.

13. The method of claim 1, 2, or 3, wherein a part of the distillate is returned to the intensifier section of said distilling column.

* * * * *